US009766001B2

(12) United States Patent
Satake et al.

(10) Patent No.: US 9,766,001 B2
(45) Date of Patent: Sep. 19, 2017

(54) CONTROL VALVE

(71) Applicant: TGK CO., LTD., Tokyo (JP)

(72) Inventors: Ryosuke Satake, Tokyo (JP); Takeshi Kaneko, Tokyo (JP); Takeshi Watanabe, Tokyo (JP); Yasushi Omata, Tokyo (JP)

(73) Assignee: TGK CO., LTD., Tokyo (JP)

( * ) Notice: Subject to any disclaimer, the term of this patent is extended or adjusted under 35 U.S.C. 154(b) by 3 days.

(21) Appl. No.: 14/839,601

(22) Filed: Aug. 28, 2015

(65) Prior Publication Data

US 2016/0084549 A1 Mar. 24, 2016

(30) Foreign Application Priority Data

Sep. 24, 2014 (JP) .................................. 2014-194347

(51) Int. Cl.

| *F16K 31/02* | (2006.01) |
| *F25B 41/06* | (2006.01) |
| *F16K 1/34*  | (2006.01) |
| *F16K 27/02* | (2006.01) |

(Continued)

(52) U.S. Cl.
CPC .............. *F25B 41/062* (2013.01); *F16K 1/34* (2013.01); *F16K 27/0209* (2013.01); *F16K 31/02* (2013.01); *G05D 16/2013* (2013.01); *G05D 23/1919* (2013.01); *F25B 2341/0683* (2013.01); *F25B 2500/13* (2013.01)

(58) Field of Classification Search
CPC ................ F25B 41/062; F25B 2500/13; F25B 2341/0683; F16K 31/02; F16K 1/34

USPC .......................................................... 267/160
See application file for complete search history.

(56) References Cited

U.S. PATENT DOCUMENTS

| 4,542,852 A   | 9/1985 | Orth et al. ....................... 236/92 |
| 5,127,237 A * | 7/1992 | Sendo ................... F25B 41/062 |
|               |        | 236/92 |

(Continued)

FOREIGN PATENT DOCUMENTS

| EP | 1 275 916 A2 | 1/2003 | .............. F25B 41/06 |
| EP | 1 457 747 A2 | 9/2004 | .............. F25B 41/06 |

(Continued)

OTHER PUBLICATIONS

EP15183525.3, European Search Report, Jan. 28, 2016, Munich.
EP1457747A3, European Search Report, Jan. 27, 2006, Munich.

*Primary Examiner* — Umashankar Venkatesan
(74) *Attorney, Agent, or Firm* — Martin Penilla Group, LLP (57) ABSTRACT

A vibration-proof spring, which coaxially inserts a shaft, is provided in a body of a control valve. The vibration-proof spring includes a cylindrical spring body, spring parts, which are integrally formed with a side wall of the spring body and are supported by the spring body in a cantilevered manner, and bulging portions, which are formed, on surfaces of the spring parts facing the shaft, in a protruding manner. The spring body is formed as a cylindrical body such that a plate-like body, which is obtained by punching a metallic plate through a press-forming process, is bent along a longitudinal direction of the plate-like body. Also, the spring body is formed in such a manner as to have edge parts that protrude radially outward from at least one of ends of the cylindrical body in the direction of axis line.

8 Claims, 8 Drawing Sheets

(51) Int. Cl.
  *G05D 16/20* (2006.01)
  *G05D 23/19* (2006.01)

(56) References Cited

U.S. PATENT DOCUMENTS

| | | | | |
|---|---|---|---|---|
| 5,957,376 A * | 9/1999 | Fujimoto | F25B 41/062 | 236/92 |
| 6,029,694 A | 2/2000 | Schwegler et al. | | 137/510 |
| 6,189,800 B1 * | 2/2001 | Fujimoto | F25B 41/062 | 236/92 |
| 6,896,190 B2 * | 5/2005 | Kobayashi | F25B 41/062 | 137/613 |
| 2004/0177632 A1 * | 9/2004 | Watari | F25B 41/062 | 62/222 |
| 2008/0185452 A1 * | 8/2008 | Kobayashi | F25B 41/062 | 236/92 |
| 2013/0283836 A1 * | 10/2013 | Satake | F25B 41/062 | 62/225 |
| 2014/0261765 A1 * | 9/2014 | Satake | F25B 41/062 | 137/340 |
| 2016/0097574 A1 * | 4/2016 | Kaneko | F25B 41/062 | 62/225 |

FOREIGN PATENT DOCUMENTS

| | | | |
|---|---|---|---|
| EP | 1 457 747 A3 | 3/2006 | F25B 41/06 |
| EP | 2 667 118 A2 | 11/2013 | F25B 41/06 |
| EP | 2 667 118 A3 | 12/2013 | F25B 41/06 |
| JP | 08145505 A | 6/1996 | F16K 31/68 |
| JP | 09222268 A | 8/1997 | F25B 41/06 |
| JP | 2001050122 A | 2/2001 | F16K 31/68 |
| JP | 2001050422 A | 2/2001 | F16K 31/68 |
| JP | 2008014628 A | 1/2008 | F25B 41/06 |
| JP | 2009192198 A | 8/2009 | F16K 31/68 |
| JP | 2013-242129 | 5/2013 | F25B 41/06 |

* cited by examiner

CONTROL VALVE

CLAIM OF PRIORITY

This application claims priority to Japanese Patent Application No. 2014-194347, filed Sep. 24, 2014, and is incorporated herein by reference.

BACKGROUND OF THE INVENTION

1. Field of the Invention

The present invention relates to a control valve and, more particularly to a structure of a vibration-proof spring suitable in preventing the vibration of an actuating section of the control valve.

2. Description of the Related Art

A refrigeration cycle in an automotive air conditioner is generally configured such that the refrigeration cycle includes a compressor, a condenser, a receiver, an expansion valve, and an evaporator. The compressor compresses a circulating refrigerant. The condenser condenses the compressed refrigerant. The receiver separates the condensed refrigerant into a gas and a liquid. The expansion valve throttles and expands the separated liquid refrigerant and delivers it by turning it into a spray. Then the evaporator evaporates the misty refrigerant and thereby cools the air inside a vehicle by the evaporative latent heat. Used as the expansion valve is a thermostatic expansion valve that senses the temperature and pressure of refrigerant at an outlet side of the evaporator such that, for example, the refrigerant led out from the evaporator has a predetermined degree of superheat and that controls the flow rate of refrigerant delivered to the evaporator by opening and closing a valve section.

This expansion valve includes a body formed with a first passage for passing the refrigerant flowing from the receiver to the evaporator and a second passage for passing the refrigerant returned from the evaporator and then supplying the refrigerant to the compressor. A valve hole is formed midway in the first passage. Provided is a valve element that closes and opens a valve section by touching and leaving the valve hole, respectively. The valve element, which moves toward and away from the valve hole, regulates the flow rate of refrigerant flowing toward the evaporator. Also provided is a power element that senses the temperature and pressure of refrigerant flowing through the second passage and controls the valve opening degree of the valve section. The drive force of the power element is transmitted to the valve element by way of an elongated shaft. One end side of the shaft is connected to the power element across the second passage. The other end thereof is connected to the valve element such that the shaft passes through an insertion hole and a valve hole formed in a partition wall provided between the first passage and the second passage.

In such an expansion valve, the pressure may fluctuate in an upstream side of the valve section where, for example, a high-temperature refrigerant is introduced. If this problem of fluctuation is left unattended, the valve element may vibrate and generate noise. The following method is available to alleviate this problem. That is, a mounting hole formed coaxially with the insertion hole is formed in the partition wall and then a cylindrically-shaped vibration-proof spring is provided in the mounting hole; this vibration-proof spring biases the shaft radially inward thereof so as to develop a sliding friction (resistance) and, as a result, the valve element does not respond sensitively to the fluctuation in pressure (see Reference (1) in the following Related Art List, for instance).

RELATED ART LIST (1) Japanese Unexamined Patent Application Publication No. 2013-242129.

In such an expansion valve as described above, the sliding friction on the shaft affects the operating characteristics of the valve element and therefore the sliding friction needs to be obtained by the vibration-proof spring as precisely intended and designed. However, when the vibration-proof spring is formed through a general press-forming process, the fixed state of the vibration-proof spring becomes unstable due to a deformation of material during the manufacturing process and this may possibly adversely affect the aforementioned sliding friction; the inventors of the present invention have proven this fact.

SUMMARY OF THE INVENTION

The present invention has been made in view of the foregoing problems, and a purpose thereof is to provide a control valve where the sliding friction of the vibration-proof spring is obtained as precisely intended and designed.

A control valve according to one embodiment of the present invention relates to a control valve, provided in a refrigeration cycle, for controlling a flow of refrigerant. The control valve includes: a body having a lead-in port through which the refrigerant is led in, a lead-out port through which the refrigerant is led out, and a valve hole formed in a refrigerant passage joining the lead-in port to the lead-out port; a valve element that opens and closes a valve section by moving toward and away from the valve hole; a drive section that generates drive force used to open and close the valve element; a shaft one end side of which connects to a movable member of the drive section and the other end side of which connects to the valve element, the shaft transmitting the drive force, generated by the drive section, in a direction of axis line to the valve element, wherein the shaft is so provided as to run through an insertion hole formed in the body; and a vibration-proof spring that applies a sliding friction to the shaft by coaxially inserting the shaft and biasing the shaft in a radially inward direction, the vibration-proof spring being contained in a mounting hole formed coaxially with the insertion hole.

The vibration-proof spring includes: a spring body, of a cylindrical shape, that is supported by an inner wall of the mounting hole; a spring part integrally formed with a side wall of the spring body, the spring part being supported by the spring body in a cantilevered manner; and a contact portion formed, on a surface of the spring part facing the shaft, in a protruding manner, wherein, when the contact portion abuts against the shaft, the spring part is warped and an elastically reactive force resulting from the warped spring part gives a sliding force to the shaft. The spring body is formed as a cylindrical body such that a plate-like body, which is obtained by punching a metallic plate through a press-forming process, is bent along a longitudinal direction of the plate-like body, and the spring body is formed in such a manner as to have an edge part that protrudes radially outward from at least one of ends of the cylindrical body in the direction of axis line and that is stopped by the inner wall of the mounting hole.

By employing this embodiment, the edge part, which protrudes radially outward, is formed at an end of the cylindrical spring body, in a forming process of the vibration-proof spring. Thus, placing the vibration-proof spring in the mounting hole allows the vibration-proof spring to be stably fixed in a manner such that the edge part is stopped by the wall surface of the mounting hole. As a result, the sliding friction, acting on the shaft, by the vibration-proof spring is obtained as precisely intended and designed.

DETAILED DESCRIPTION OF THE INVENTION

The invention will now be described in detail based on preferred embodiments with reference to the accompanying drawings. This does not intend to limit the scope of the present invention, but to exemplify the invention.

In the following description, for convenience of description, the positional relationship in each structure may be expressed according to how each component is depicted in Figures. Note that the almost identical components are given the identical reference numerals in the following embodiments and their modifications and that the repeated description thereof will be omitted as appropriate.

The present embodiment is a constructive reduction to practice of the present invention where an expansion valve according to the preferred embodiments is used as a thermostatic expansion valve applied to a refrigeration cycle of an automotive air conditioner. The refrigeration cycle in the automotive air conditioner is configured by including a compressor, a condenser, a receiver, an expansion valve, and an evaporator. Here, the compressor compresses a circulating refrigerant. The condenser condenses the compressed refrigerant. The receiver separates the condensed refrigerant into a gas and a liquid. The expansion valve throttles and expands the separated liquid refrigerant and delivers it by turning it into a spray. The evaporator evaporates the misty refrigerant and thereby cools the air inside a vehicle's passenger compartment by the evaporative latent heat. A detailed description of each component except for the expansion valve in this refrigeration cycle is omitted in the following.

Figure 1:
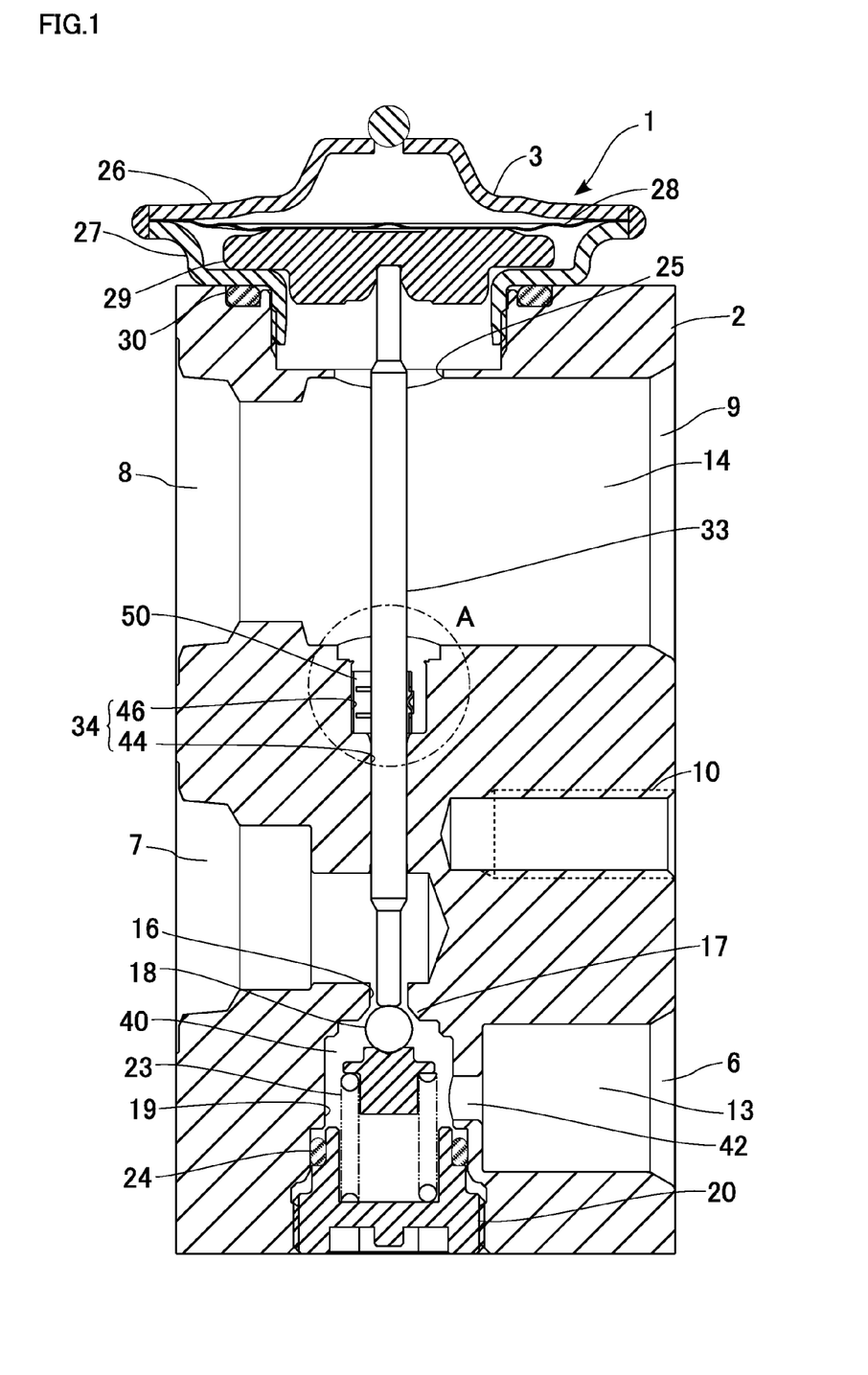
FIG. 1 is a cross-sectional view of an expansion valve according to an embodiment.

FIG. 1 is a cross-sectional view of an expansion valve according to an embodiment of the present invention.

An expansion valve 1 has a body 2. This body 2 is formed such that a member, which is obtained by extrusion-molding a raw material made of an aluminum alloy, is subjected to a predetermined cutting work. This body 2, which is prismatic in shape, is provided with a valve section. This valve section, which throttles and expands the refrigerant, is provided inside the body 2. A power element 3, which functions as a temperature-sensing section, is provided at a longitudinal end of the body 2.

The body 2 has a lead-in port 6, a lead-out port 7, a lead-in port 8, and a lead-out port 9 on sides thereof. The lead-in port 6 receives a high-temperature and high-pressure liquid refrigerant from a receiver side (condenser side). Through the lead-out port 7, a low-temperature and low-pressure refrigerant, which is throttled and expanded by the expansion valve 1, is supplied to the evaporator. The lead-in port 8 receives the refrigerant evaporated by the evaporator. Through the lead-out port 9, the refrigerant, which has passed through the expansion valve 1, returns to the compressor side. A screw hole 10, through which a not-shown stud bolt used to mount the piping can be studded, is formed between the lead-in port 6 and the lead-out port 9. A piping joint is connected to each port.

In the expansion valve 1, a first passage 13 is configured by the lead-in port 6, the lead-out port 7, and a refrigerant passage connecting these ports. A valve section is provided in a middle part of the first passage 13. The refrigerant introduced from the lead-in port 6 is throttled and expanded through this valve section and then turned into a spray so as to be supplied to the evaporator through the lead-out port 7. Also, a second passage 14, which corresponds to "return passage", is configured by the lead-in port 8, the lead-out port 9, and a refrigerant passage connecting these ports. The second passage 14 extends straight, and the refrigerant is led in through the lead-in port 8 and then delivered to the compressor through the lead-out port 9.

A valve hole 16 is provided in a middle part of the first passage 13 in the body 2, and a valve seat 17 is formed by an opening end edge on a lead-in port 6 side of the valve hole 16. A valve element 18 is so placed as to face the valve seat 17 from a lead-in port 6 side. The valve element 18 is constructed such that a spherical ball valve element, which closes and opens the valve section by touching and leaving the valve seat 17, respectively, is joined to a valve element support that supports the ball valve element from below.

In a lower end part of the body 2, a communication hole 19, which communicates to and from the body 2, is formed in a direction perpendicular to the first passage 13, and a valve chamber 40, which contains the valve element 18, is formed by an upper half of the communication hole 19. The valve chamber 40 communicates with the valve hole 16 at an upper end of the valve chamber 40, and the valve chamber 40 communicates with the lead-in port 6 on a lateral side of the valve chamber 40 through a small hole 42. Thereby, the valve chamber 40 constitutes a part of the first passage 13. The small hole 42 is formed such that the cross section of part of the first passage 13 is locally narrowed, and the small hole 42 is open into the valve chamber 40.

In a lower half of the communication hole 19, an adjustment screw 20 (which corresponds to "adjustment member") is screwed in such a manner as to seal the communication hole 19 from the outside. A spring 23, which biases the valve element 18 in a valve closing direction, is set between the valve element 18 (more precisely, the valve element support) and the adjustment screw 20. The spring load of the spring 23 can be adjusted by a screwing amount of the adjustment screw 20 into the body 2. An O-ring 24, which is used to prevent the leakage of refrigerant, is set between the adjustment screw 20 and the body 2.

In an upper end part of the body 2, a communication hole 25, which communicates to and from the body 2, is formed in a direction perpendicular to the second passage 14, and the power element 3 (which corresponds to "temperature-sensing section") is screwed in such a manner as to seal off the communication hole 25. The power element 3 is configured such that a diaphragm 28 formed of a sheet metal is held between an upper housing 26 and a lower housing 27 and such that a disk 29 is disposed on a lower housing 27 side. A gas used to sense the temperature is filled in a hermetically sealed space enclosed by the upper housing 26 and the diaphragm 28. An O-ring 30, which is used to prevent the leakage of refrigerant, is set between the power element 3 and the body 2. The pressure and temperature of refrigerant passing through the second passage 14 are transmitted to an undersurface of the diaphragm 28 by way of the communication hole 25 and grooves provided in the disk 29.

A stepped hole 34 (functioning as an "insertion hole") that connects the first passage 13 to the second passage 14 is provided in a central part of the body 2, and an elongated shaft 33 is slidably inserted into a smaller-diameter part 44 of the stepped hole 34. The shaft 33, which is a rod formed of a metal (e.g., stainless steel) is set between the disk 29 and the valve element 18. With this structure and arrangement, a drive force generated by a displacement of the diaphragm 28 is transmitted to the valve element 18 by way of the disk 29 and the shaft 33 so as to open and close the valve section.

An upper half of the shaft 33 moves across the second passage 14, whereas a lower half thereof slidably penetrates the smaller-diameter part 44 of the stepped hole 34. A vibration-proof spring 50 is contained in a larger-diameter part 46 (functioning as a "mounting hole") of the stepped hole 34. Here, the vibration-proof spring 50 is used to exert a biasing force, whose direction is vertical to a direction of axis line, on the shaft 33; in other words, the vibration-proof spring 50 is used to exert a lateral load (sliding load) on the shaft 33. As the shaft 33 receives the lateral load of the vibration-proof spring 50, the vibration of the shaft 33 and the valve element 18 caused by a change in the refrigerant pressure is suppressed or inhibited.

In the expansion valve 1 as configured above, the power element 3 senses the pressure and the temperature of the refrigerant that has been brought back from the evaporator via the lead-in port 8 and thereby the diaphragm 28 develops a displacement. The displacement developed by the diaphragm 28 becomes the drive force and is then transmitted to the valve element 18 via the disk 29 and the shaft 33, thereby opening and closing the valve section. Also, the liquid refrigerant supplied from the receiver is introduced from the lead-in port 6 and then passes through the valve section. Having thus passing through the valve section throttles and expands the liquid refrigerant, and thereby turns it into a low-temperature and low-pressure misty refrigerant. This misty refrigerant is delivered toward the evaporator from the lead-out port 7.

Figure 2A:
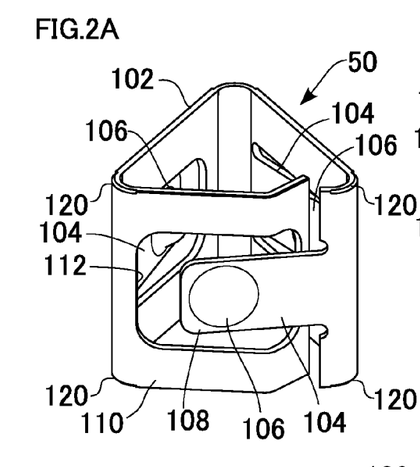
FIGS. 2A to 2D each shows a structure of a vibration-proof spring and a mounting structure thereof.
Figure 2B:
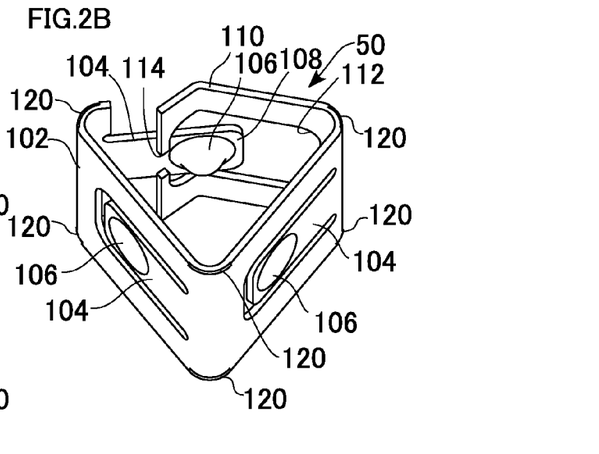
Figure 2C:
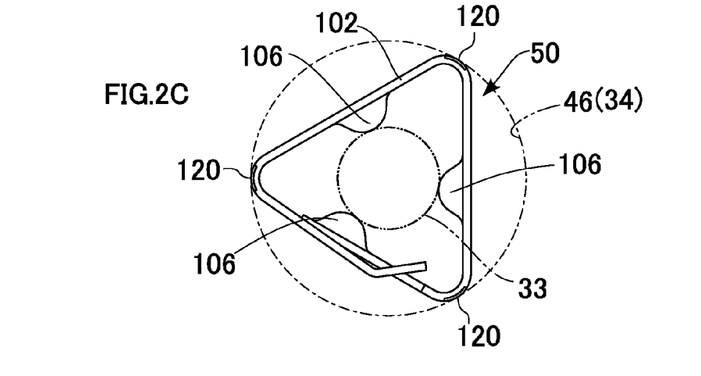
Figure 2D:
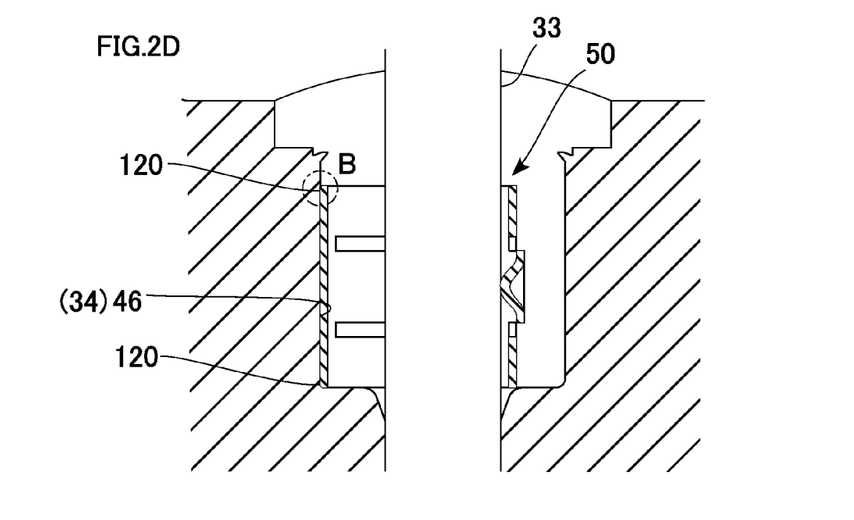

A description is now given of a structure of the vibration-proof spring 50 and a mounting structure thereof. FIGS. 2A to 2D each shows a structure of a vibration-proof spring 50 and a mounting structure thereof. FIG. 2A is a perspective view of the vibration-proof spring 50 viewed from a front side. FIG. 2B is a perspective view of the vibration-proof spring 50 viewed from a back side. FIG. 2C is a plain view showing a state where the vibration-proof spring 50 is inserted to the larger-diameter part 46. FIG. 2D is an enlarged view of a region A encircled in FIG. 1.

As shown in FIGS. 2A to 2C, the vibration-proof spring 50 has a spring body 102, of a triangular tube (cylindrical) shape in cross section, with flat side walls, and spring parts 104 integrally formed with their respective side walls. Note hereinafter that the spring body 102 is simply referred to as a "body 102" also. One of the three spring parts 104 is constituted by a portion that extends at one end of the body 102. Each of the two remaining spring parts 104 is constructed by a residue part obtained after each side wall of the body 102 has been punched into a U-shape profile. Each spring part 104 is constructed such that a base end section of the spring part 104 is supported by the body 102 in a cantilevered manner and such that a tip of the spring part 104 extends circumferentially along most of the side wall of the body 102. In a tip of the spring part 54, a semispherical bulging portion 106 (which corresponds to "contact portion") is formed inwardly of the body 102 in a protruding manner.

The vibration-proof spring 50 is formed such that a band-like plate is bent at a plurality of positions along an extending direction. Thus there is a slit in a side wall where both ends of a single plate bent are disposed opposite to each other. In other words, one of the spring parts 104 forms one end 108 of the body 102, and said one end 108 thereof has a projected shape. An opening 112 having an approximately rectangular shape is formed at the other end 110 of the body 102, and a tip of the other end 110 is bent inward. The one end 108 is inserted to the opening 112 with the bent portion of the other end 110 as an inlet port and thereby the ends 110 and 108 overlap with each other.

As shown in FIG. 2B, a tip of the other end 110 is partially open and the other end 110 has a slit 114. However, the width of this slit 114 is set to a value equal to or less than the width of the spring part 104, which is one end 108 of the body 102. Thus, when the one end 108 and the other end 110 are fit to each other with no load applied to the vibration-proof spring 50, the slit 114 is substantially closed. This structure makes it more difficult to other members be caught in a gap between the both ends 108 and 110 of the body 102. In other words, it is assumed herein that in the distribution processes, instead of a single unit of vibration-proof spring 50, a plurality of vibration-proof springs 50 are packed in one box, for instance. This helps a plurality of vibration-proof springs 50 easily handled in packing them so that the plurality of vibration-proof springs 50 are not entangled with each other in such a situation.

In an unloaded state where the vibration-proof spring 50 is not yet inserted to the larger-diameter part 46 (insertion hole), a corner of the body 102 where the both ends of the body 102 are located is placed slightly outwardly, so that the vibration-proof spring 50 is a non-equilateral triangle in shape. When the vibration-proof spring 50 is inserted into the stepped hole 34, a load is applied such that the both ends thereof come closer to each other and then the vibration-proof spring 50 is inserted thereinto when the shape of the vibration-proof spring 50 in cross section is close to an equilateral triangle. The vibration-proof spring 50 is inserted into the stepped hole 34 while it is elastically deformed from the unloaded state. Thus, as shown in FIG. 2C, the vibration-proof spring 50 is secured to the larger-diameter part 46 by an elastically reactive force produced when the load is released.

In particular, the vibration-proof spring 50 is configured such that edge parts 120, which minutely protrude radially outward, are provided at positions corresponding to vertices (corners) of the triangular body 102 at upper ends and lower ends thereof. The edge parts 120 are stopped by an inner wall of the larger-diameter part 46 in an engaged manner. Thereby, the vibration-proof spring 50 is stopped in the direction of axis line. Specifically, as shown in FIGS. 2C and 2D, the vibration-proof spring 50 abuts against the inner wall of the larger-diameter part 46 at ridge lines in the direction of axis line where the vertices of the body 102, which is a triangular shape in cross section, are located. In this state, the edge parts 120 formed on both ends of the body 102 in the direction of axis line are caught and stopped by the inner wall of the larger-diameter part 46. This configuration prevents the movement and displacement of the vibration-proof spring 50 in the direction of axis line.

When, on the other hand, the vibration-proof spring 50 is inserted to the larger-diameter part 46, the three spring parts 104 produce a lateral load (a radially inward load) toward the shaft 33. That is, as the shaft 33 is inserted to the vibration-proof spring 50, as shown in FIG. 2C, while the vibration-proof spring 50 is inserted to the larger-diameter part 46, the three spring parts 104 are bent or warped outwardly up to the positions where the three spring parts 104 are almost coplanar with the side walls of the body 102; as a result, an elastically reactive force of the spring parts 104 creates an appropriate sliding force (sliding friction) on the shaft 33. Inserting the shaft 33 in this manner makes the spring parts 104 bent or warped radially outward. If, in this case, the spring parts 104 are plastic-deformed to a certain degree, the pressing force of the spring parts 104 to the shaft 33 (i.e., the sliding force in between the bulging portions 106 and the shaft 33) can be stabilized. In other words, the spring part 104 may be used in an elastic region or in a plastic region.

Note that if the vibration-proof spring 50 is inserted to the larger-diameter part 46 as shown in FIG. 2C, the three bulging portions 106 will touch the shaft 33 at three points, namely the three bulging portions 106 will be in point-contact with the shaft 33. This structure constantly ensures the point-contact state of the bulging portions 106 and the shaft 33 even though the shaft 33 is slightly tilted, for instance. Hence, the smooth support condition by the vibration-proof spring can be maintained. Since the vibration-proof spring 50 is held stably in a fixed position and is stopped by the edge parts 120, the sliding friction (sliding resistance) acting on the shaft 33 can be maintained at a precisely intended value. In other words, the vibration-proof spring 50 does not slide relative to the larger-diameter part 46, and the sliding friction working on the shaft 33 can be only one caused by the sliding movement relative to the vibration-proof spring 50.

Figure 3A:
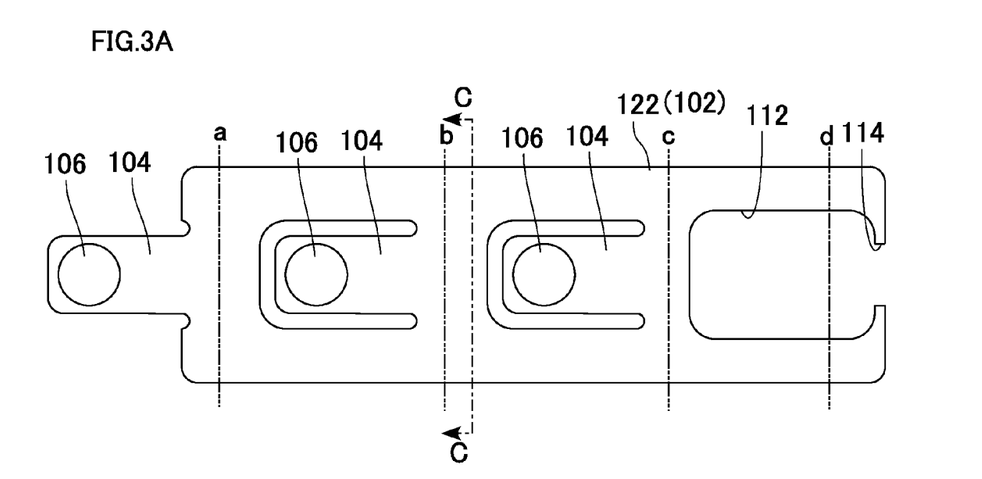
FIGS. 3A to 3E each shows a main part of a method of manufacturing the vibration-proof spring.
Figure 3B:
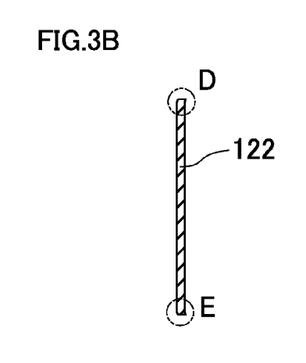
Figure 3C:
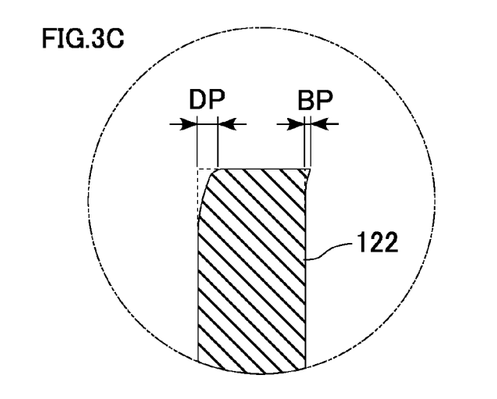
Figure 3D:
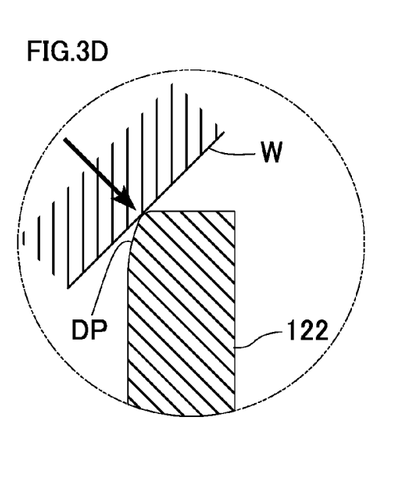
Figure 3E:
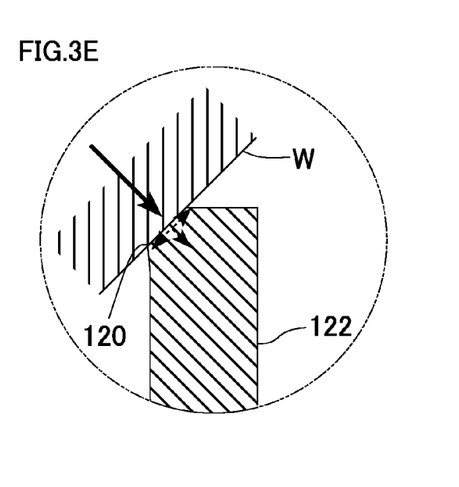

FIGS. 3A to 3E each shows a main part of a method of manufacturing the vibration-proof spring 50. FIG. 3A is a development view showing a state of the vibration-proof spring 50 before it is bent. FIG. 3B is a cross-sectional view taken along the line C-C and viewed on the arrows of FIG. 3A. FIG. 3C is an enlarged view of a region D encircled in FIG. 3B. FIGS. 3D and 3E each schematically shows a forming process of an edge part 120.

As shown in FIG. 3A, in the forming process of the vibration-proof spring 50, a not-shown metallic plate is first punched into a plate-like body 122 through a press-forming. This metallic plate is formed of a material, having a high elasticity, such as stainless steel. More specifically, the metallic plate is subjected to the press-forming using a predetermined metal mold so as to form a spring part 104 into the projected and recessed shapes at both ends of the metallic plate and, at the same time, two spring parts 104 are formed in positions corresponding to the respective side walls of the body 102. At this time, the bulging portion 106 is formed on each spring part 104 by the press-forming. In the example, the shearing is done from the surface toward the back of FIG. 3A.

Accordingly, as shown in FIGS. 3B and 3C, a burr BP occurs on an edge of the plate-like body 122 toward a tip side of the shearing direction, whereas a rollover (shear-drop) DP occurs on a rear-end side thereof. Although FIG. 3C shows an enlarged view of the region D in FIG. 3B, the same phenomenon occurs in a region E (an edge positioned opposite to the region D in the width direction of the plate-like body 122). If a cylindrical body is formed such that the rollover DP is positioned radially outward, the vibration-proof spring 50 is more likely to be displaced (slide) relative to the larger-diameter part 46 as will be discussed later.

In the light of this, in the present embodiment, as shown by an arrow in FIG. 3D, an edge of the plate-like body 122, where the rollover DP has been formed, undergoes compression forming by means of press. Thereby, as shown in FIG. 3E, the edge part 120, which protrudes on one surface side of the plate-like body 122 is formed; here, one surface side of the plate-like body 122 corresponds to the side where the rollover DP has been formed. In the present embodiment, a pressurizing surface of a predetermined tool W is pressed against the plate-like body 122 such that the pressurizing surface forms a predetermined angle (e.g., 45 degrees) relative to each of two faces, which connect to the rollover DP, so as to apply a compression stress to the plate-like body 122. This causes a part of material located in the rollover DP to flow toward one surface side of the plate-like body 122 along the pressurizing face of the tool W (see the dotted arrow), thereby forming the edge part 120. Although, in the present embodiment, the burr BP is removed before the forming of the edge part 120, the press-forming may be carried out such that the burr BP is crushed or deformed together with the forming of the edge part 120. The burr BP may not be removed.

In this manner, after the forming of the edge part 120, the plate-like body 122 is bent at a plurality of positions (i.e., a to d shown in FIG. 3A) along the extending direction thereof. As a result, the vibration-proof spring 50 comprised of the cylindrical body having a triangular shape in cross section is obtained (see FIG. 2A). In other words, performing a so-called forming processing on the plate-like body 122 and bending this plate-like body 122 between the adjacent spring parts 104 form the triangular cylindrical body.

A description is now given of operations and their advantageous effects carried out and achieved by the present embodiment.

Figure 4A:
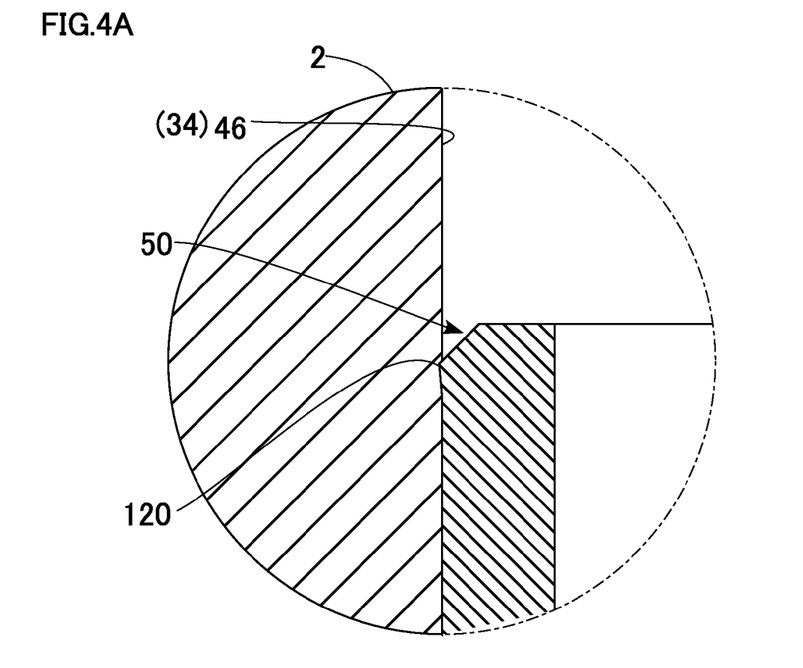
FIGS. 4A and 4B are each a partially enlarged view showing a fixing structure of a vibration-proof spring to a mounting hole.
Figure 4B:
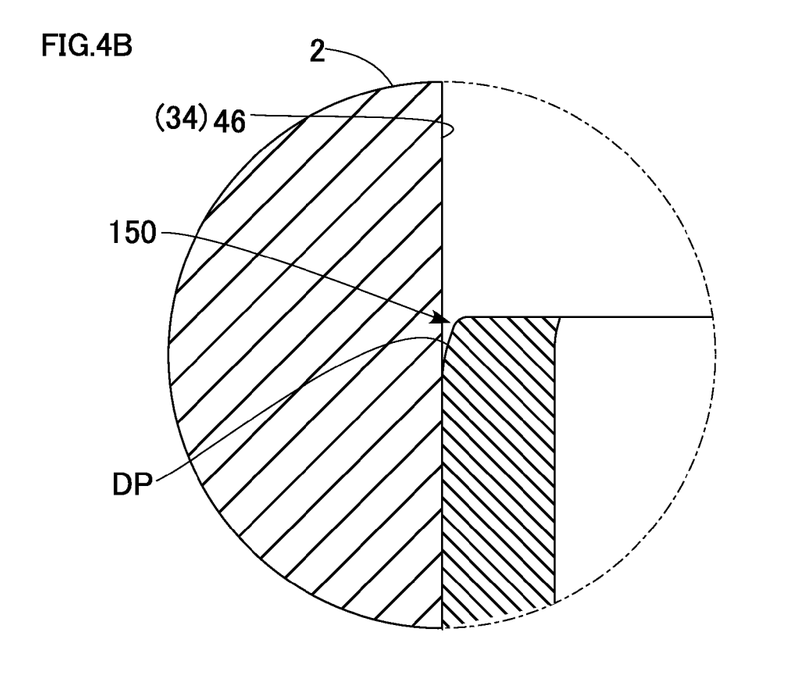
Figure 5:
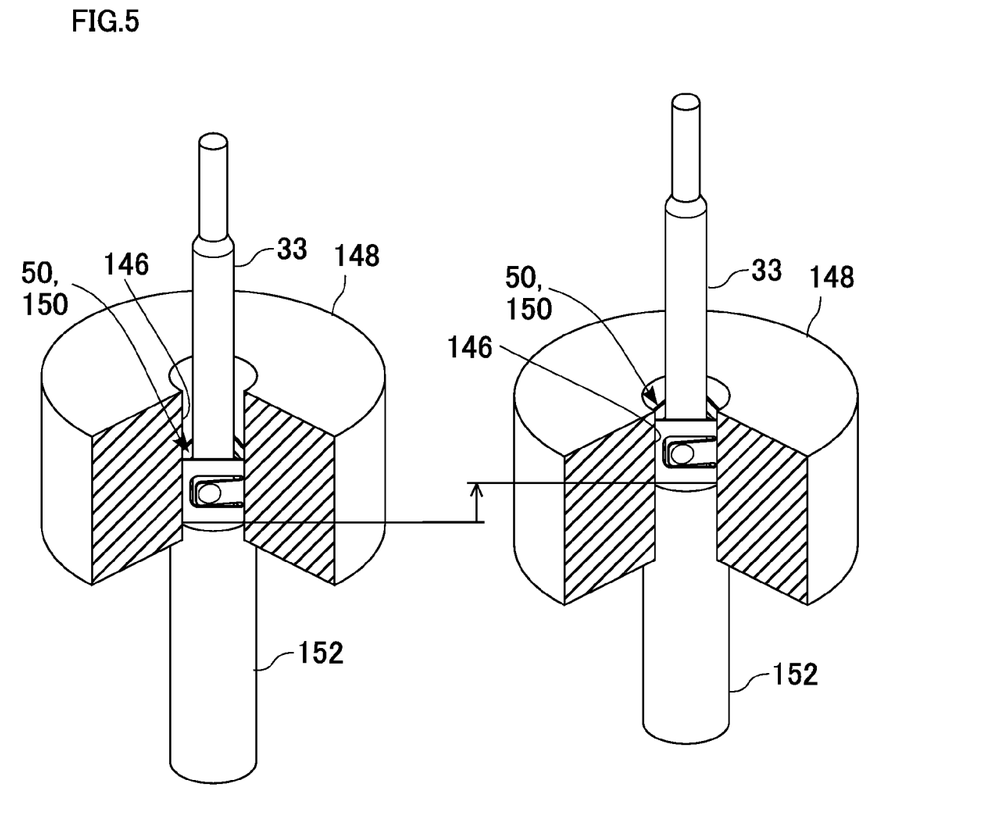
FIG. 5 shows an experimental method used to verify the stability of a vibration-proof spring in a fixed state.
Figure 6:
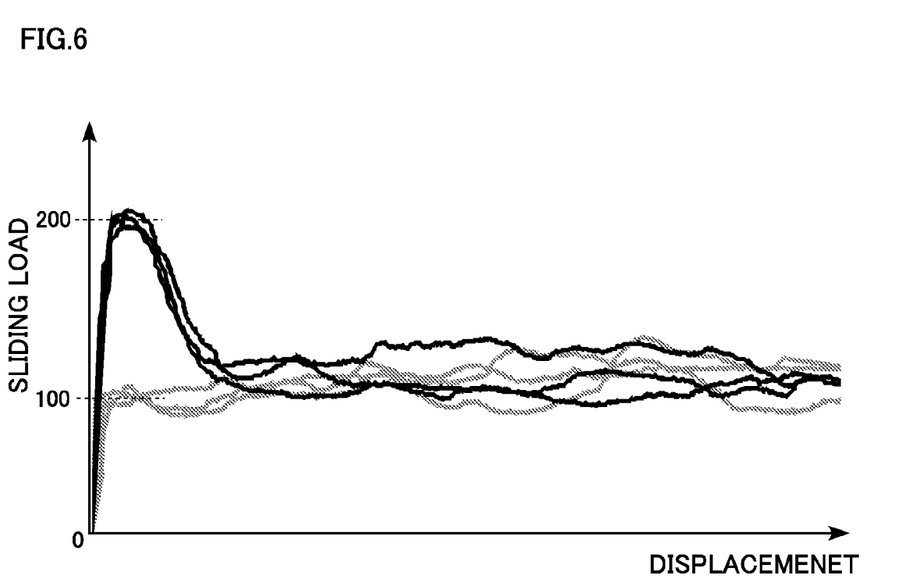
FIG. 6 shows experimental results.

FIGS. 4A and 4B are each a partially enlarged view showing a fixing structure of the vibration-proof spring to the mounting hole. FIG. 4A shows a structure of the present embodiment having the edge part; FIG. 4A is an enlarged view of a region B in FIG. 2D. FIG. 4B shows a structure of a comparative example having no edge part. In contrast to the plate-like body 122 shown in FIG. 3C, this comparative example shows the structure where the plate-like body 122 does not undergo the compression forming as shown in FIG. 3D. FIG. 5 shows an experimental method used to verify the stability of the vibration-proof spring 50 in a fixed state. FIG. 6 shows experimental results. The vertical axis of FIG. 6 indicates the magnitude of a sliding load when the load in the direction of axis line is applied to the vibration-proof spring and then the vibration-proof spring starts to slide; the horizontal axis thereof indicates the displacement of the vibration-proof spring. Black curves in FIG. 6 indicate the results of the present embodiment, while the gray ones indicate the experimental results of the comparative example.

As shown in FIG. 4A, the vibration-proof spring 50 according to the present embodiment is stopped by the inner wall of the larger-diameter part 46 in an engaged manner such that the edge part 120, which protrudes radially outward, bites into the inner wall thereof. Thus, even though the vibration-proof spring 50 is biased in the direction of axis line by a frictional force between the vibration-proof spring 50 and the shaft 33, the vibration-proof spring 50 is stably supported while it is fixed to the larger-diameter part 46. In contrast to this, as shown in FIG. 4B, a vibration-proof spring 150 according to the comparative example lacks any element that can be caught in the larger-diameter part 46 by forming the rollover DP. Thus, the vibration-proof spring 150 may possibly be displaced in the direction of axis line depending on the magnitude of the frictional force between the vibration-proof spring 150 and the shaft 33.

To verify this, the experiments as shown in FIG. 5 are conducted. Specifically, a body 148, for use in measuring the load, having a mounting hole 146 made of the same material as that of the larger-diameter part 46 and the same dimensions as those thereof, is prepared and then the vibration-proof spring 50 or 150 is installed in the mounting hole 146. Subsequently, the shaft 33 is inserted to the vibration-proof spring in a similar manner to the normal use mode, so that the sliding friction can now be applied between the shaft 33 and the vibration-proof spring. In this state, a cylindrical tool 152 is inserted from below the mounting hole 146, and the vibration-proof spring and the shaft 33 are simultaneously pressed. Then, measured is the change of the load applied to the tool 152 (the sliding load of the vibration-proof spring) starting from when the vibration-proof spring is fixed in the installation position (left in FIG. 5) until when it is displaced by a certain length (right in FIG. 5) (see arrows in FIG. 5).

In these experiments, the measurements for the respective structures according to the present embodiment and comparative example are conducted a plurality of times. As a result, as shown in FIG. 6, it is found that when the structure according to the present embodiment is employed, the load required to cause the vibration-proof spring to be displaced is much larger than the load required when the structure according to the comparative example is employed. As shown in FIG. 6, the load required for the vibration-proof spring 50 according to the present embodiment to start the sliding movement is about twice as large as the load required for the vibration-proof spring 150 according to the comparative example to start the sliding movement. In other words, it is found that provision of the edge parts 120 as with the present embodiment allows the vibration-proof spring 50 to be stably fixed relative to the larger-diameter part 46. For convenience, in FIG. 6 the sliding load is expressed by the relative values instead of the actual measurement values.

As explained above, according to the present embodiment, the edge parts 120, which protrude radially outward, are formed at the ends of the cylindrical body 102, in a forming process of the vibration-proof spring 50. Thus, placing the vibration-proof spring 50 in the larger-diameter part 46 (the mounting hole) increases the local surface pressure exerted by the edge parts 120 thereof, so that the vibration-proof spring 50 is stably fixed in a manner such that the edge parts 120 are stopped by the wall surface of the larger-diameter part 46 in an engaged manner. As a result, the sliding friction, acting on the shaft 33, by the vibration-proof spring 50 is obtained as precisely intended and designed.

The description of the present invention given above is based upon illustrative embodiments. These embodiments are intended to be illustrative only and it will be obvious to those skilled in the art that various modifications could be further developed within the technical idea underlying the present invention.

Figure 7A:
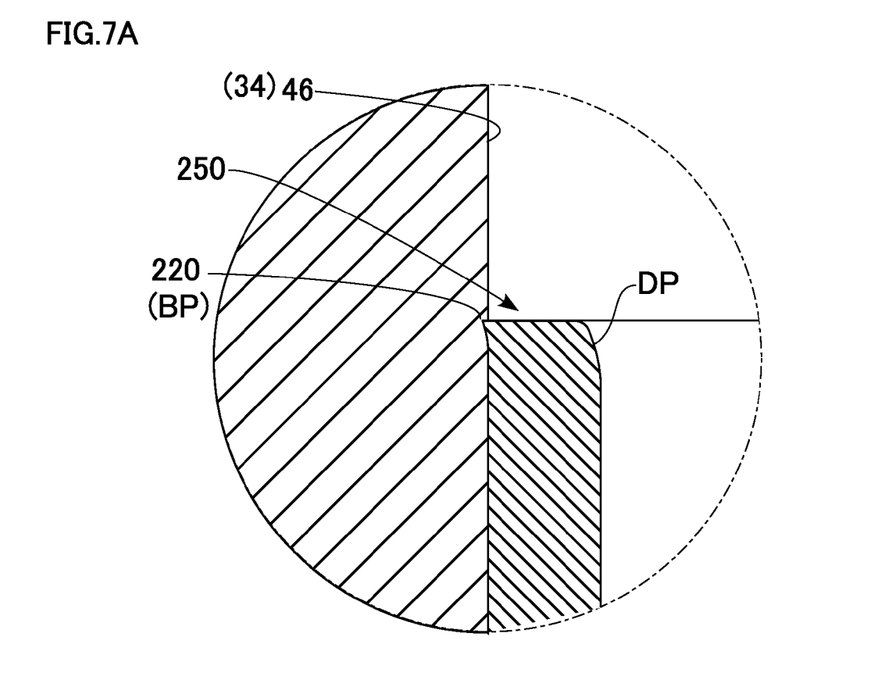
FIGS. 7A and 7B are each a partially enlarged view showing a fixing structure of a vibration-proof spring to a mounting hole, according to a modification.
Figure 7B:
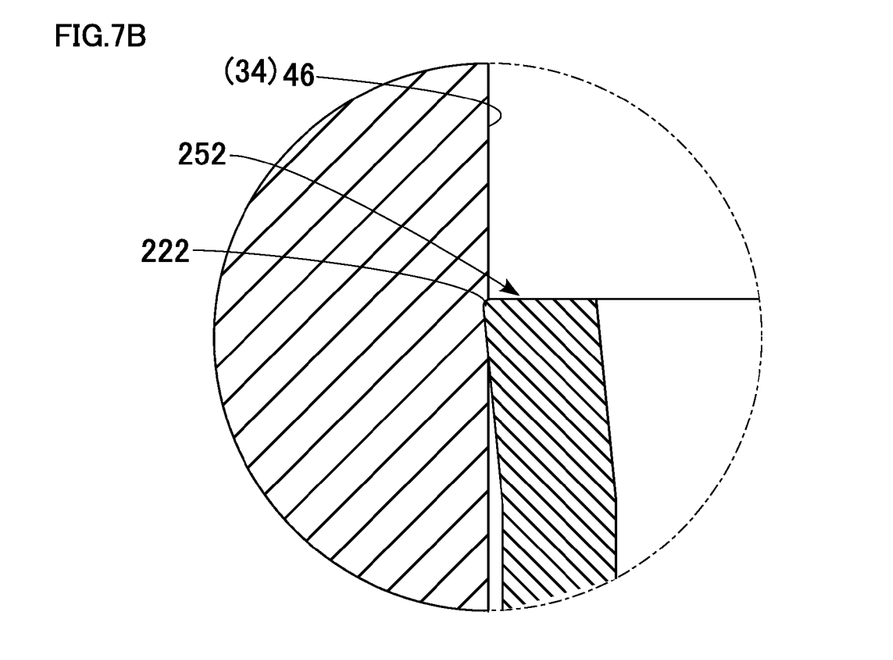

In the above-described embodiment, the example has been shown where a press-forming is used as a method of forming the edge parts 120 in the vibration-proof spring 50. In a modification, a method other than the press-forming may be used. FIGS. 7A and 7B are each a partially enlarged view showing a fixing structure of the vibration-proof spring to the mounting hole, according to a modification. FIG. 7A shows a first modification, and FIG. 7B shows a second modification.

As shown in FIG. 7A, a vibration-proof spring 250 according to the first modification produces an edge part 220 when the plate-like body 122 shown in FIG. 3A is bent on a surface side opposite to that in the above-described embodiment. Specifically, the edge part 220 is obtained by forming-processing (bending process) the plate-like body 122 in a manner such that the rollover DP, which is generated when the plate-like body 122 is formed, is located at an inner circumference side of the cylindrical body. The edge part 220 uses the burr BP.

On the other hand, as shown in FIG. 7B, a vibration-proof spring 252 according to the second modification produces an edge part 222 when a width-direction end of the plate-like body 122 shown in FIG. 3A is bent toward a surface side where the rollover DP is formed. Specifically, after the width-direction end of the plate-like body 122 is bent as described above, the plate-like body 122 is forming-processed (bent) such that the rollover DP is located at an outer circumstance side of the cylindrical body, and thereby an edge part 222 protruding radially outward is obtained.

Figure 8:
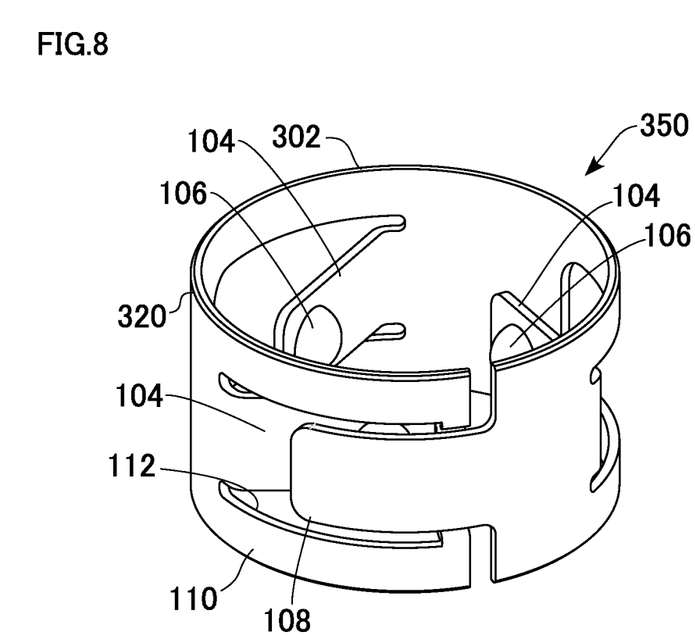
FIG. 8 is a perspective view showing a structure of a vibration-proof spring according to a modification.

In the above-described embodiment, the vibration-proof spring 50 is so configured as to be of triangular tube (cylindrical) shape but may be so configured as to be of any other polygonal shape or circularly cylindrical shape, instead. FIG. 8 is a perspective view showing a structure of a vibration-proof spring according to a modification. In this modification, a body 302 of a vibration-proof spring 350 is of a cylindrical shape. An edge part 320, which protrudes radially outward, is provided on a periphery of the width-direction end of the body 302. The edge part 320 may be formed by using the press-forming method similar to that used in the above-described embodiment, by using the burr BP as with the first modification or by using the method of bending the end as with the second modification.

In the above-described embodiment, the example is shown where, as shown in FIGS. 2A to 2D, the edge parts 120 are formed at both the upper ends and the lower ends of the vibration-proof spring 50. In the modification, the edge parts 120 may be only formed at either the upper ends or the lower ends of the vibration-proof spring 50.

In the above-described embodiment, the exemplary configuration is shown where the formation of edge parts 120 on the outer circumstance of the vibration-proof spring 50 keeps the fixed state between the vibration-proof spring 50 and the larger-diameter part 46. In a modification, the configuration may be such that a recess (step difference) is formed in a predetermined position of the inner wall surface of the mounting hole (the larger-diameter part 46) and such that the ends of the vibration-proof spring 50 are stopped thereby in an engaged manner. In this case, a portion of the vibration-proof spring 50 including the rollover DP may be stopped by this recess in an engaged manner.

In the above-described embodiment, as shown in FIG. 2C, the example is shown where when the shaft 33 is inserted while the vibration-proof spring 50 is inserted to the larger-diameter part 46, the three spring parts 104 are almost coplanar with their side walls. In a modification, the configuration may be such that when such a shaft 33 is inserted, the three spring parts 104 are warped outwardly of the side walls. Since the body 102 is of a polygonal shape, the spring part 104 can be warped using a gap formed between the side wall of the body 102 and the larger-diameter part 46.

Also, the configuration may be such that when no load is applied to the vibration-proof spring 50, the spring part 104 is positioned along the side wall of the body 102. Also, when the vibration-proof spring 50 is inserted to the larger-diameter part 46 and when the shaft 33 is inserted to this vibration-proof spring 50, the spring part 104 may be warped outwardly of the body 102. Alternatively, the configuration may be such that when the shaft 33 is inserted thereto like this, three spring parts 104 are positioned inwardly of the side walls. The three spring parts 104 are so configured as to be positioned coplanar with their side walls or warped outwardly of the side walls of the body 102 when the shaft 33 is inserted like this; with this configuration, it is advantageous in that the body 102 can be constructed in a smaller size.

In the above-described embodiment, a semispherical shape is described as the shape of the bulging portion 106 but a shape or form other than the semispherical one, such as an arch-like shape, may be selected, as appropriate, so long as such a shape or form, which protrudes inwardly, can apply an appropriate sliding load on the shaft 33. Also, in the above-described embodiment, the example is described where the body 102 of the vibration-proof spring 50 is of a triangular shape in cross section. Instead, the shape or form thereof may be a rectangular or square shape or any other polygonal shape in cross section.

The expansion valve according to the above-described embodiment is suitably applied to and used for a refrigeration cycle where hydrochlorofluorocarbon (HFC-134a and so forth) is used as the refrigerant. Also, the expansion valves according to the present embodiment and its modifications may be applied to a refrigeration cycle where a refrigerant, such as carbon dioxide, whose working pressure is high is used. In such a case, an external heat-exchanger such as a gas cooler may be placed in the refrigerant cycle, instead of the condenser. In this case, disk springs each formed of a metal, for example, may be disposed in superposition for the purpose of reinforcing the diaphragm constituting the power element 3. Alternatively, the disk springs or the like may be provided in place of the diaphragm.

In the above-described embodiment, the example is shown where the vibration-proof spring is applied to an expansion valve. In a modification, the vibration-proof spring according to the embodiment and its embodiments may be applied to a control valve installed in a variable displacement compressor. This valve varies the discharging capacity of the variable displacement compressor for compressing the refrigerant led into a suction chamber and then discharging the compressed refrigerant from a discharge chamber, by regulating the flow rate of the refrigerant led into a crankcase from the discharge chamber.

This control valve includes: a body having a discharge chamber communication port communicating with the discharge chamber, a crankcase communication port communicating with the crankcase, and a valve hole formed in a passage connecting the discharge chamber communication port and the crankcase communication port; a valve element for opening and closing a valve section, the valve element being arranged in such a manner as to be able to move toward and away from the valve hole; a solenoid, provided in the body, which generates force with which to drive the valve element in a valve closing direction, the solenoid being such that an electric conduction state is controlled by a PWM (Pulse Width Modulation) technique; a shaft for transmitting the force generated by the solenoid to the valve element; and a vibration-proof spring that applies a sliding friction to the shaft by biasing the shaft in a radially inward direction in such a manner as to hold the shaft in a hollow center of the spring.

The shaft is so provided as to pass through the insertion hole formed in the body. One end side of the shaft connects to a plunger (movable member) of a solenoid, whereas the other end side thereof connects the valve element. The shaft transmits the drive force, generated by the solenoid, in the direction of axis line to the valve element. The vibration-proof spring is contained in the mounting hole formed coaxially with the insertion hole, and applies the sliding friction to the shaft by coaxially inserting the shaft and biasing the shaft in a radially inward direction. The mounting hole may be provided in a core of the solenoid. The vibration-proof spring may be configured according the above-described embodiment or the modifications.

The present invention is not limited to the above-described embodiments and modifications only, and those components may be further modified to arrive at various other embodiments without departing from the scope of the invention. Also, various other embodiments may be further formed by combining, as appropriate, a plurality of structural components disclosed in the above-described embodiments and modifications. Also, one or some of all of the components exemplified in the above-described embodiments and modifications may be left unused or removed.

What is claimed is:

1. A control valve, provided in a refrigeration cycle, for controlling a flow of refrigerant, the control valve comprising:

a body having a lead-in port through which the refrigerant is led in, a lead-out port through which the refrigerant is led out, and a valve hole formed in a refrigerant passage joining the lead-in port to the lead-out port;

a valve element that opens and closes a valve section by moving toward and away from the valve hole;

a drive section that generates drive force used to open and close the valve section;

a shaft one end side of which connects to a movable member of the drive section and an other end side of which connects to the valve element, the shaft transmitting the drive force, generated by the drive section, in a direction of axis line to the valve element, wherein the shaft is so provided as to run through an insertion hole formed in the body; and a vibration-proof spring that applies a sliding friction to the shaft by coaxially inserting the shaft and biasing the shaft in a radially inward direction, the vibration-proof spring being contained in a mounting hole formed coaxially with the insertion hole, the vibration-proof spring including:

a spring body, of a cylindrical shape, that is supported by an inner wall of the mounting hole;

a spring part integrally formed with a side wall of the spring body, the spring part being supported by the spring body in a cantilevered manner; and a contact portion formed, on a surface of the spring part facing the shaft, in a protruding manner, wherein, when the contact portion abuts against the shaft, the spring part is warped and an elastically reactive force resulting from the warped spring part gives a sliding force to the shaft, wherein the spring body is formed as a cylindrical body such that a plate-like body, which is obtained by punching a metallic plate through a press-forming process, is bent along a longitudinal direction of the plate-like body, and the spring body is formed in such a manner as to have an edge part that protrudes radially outward from at least one of ends of the cylindrical body in the direction of axis line and that is stopped by the inner wall of the mounting hole, wherein an outer circumferential edge of the end has an inclined face at an angle to the direction of axis line of the cylindrical body, and wherein the edge part protrudes radially outward from an outer circumferential surface of the cylindrical body at a corner where the outer circumferential surface and the inclined face intersect.

2. A control valve according to claim 1, wherein the edge part is obtained by press-forming a rollover generated when the plate-like body is formed.

3. A control valve according to claim 1, wherein the spring body is formed as a polygon-shaped cylindrical body having a plurality of side walls, wherein the spring part is formed on each of the plurality of side walls and the spring part abuts against the shaft at each of a plurality of positions, and wherein the edge part is provided at each of positions corresponding to each of vertices of the cylindrical body.

4. A control valve according to claim 2, wherein the spring body is formed as a polygon-shaped cylindrical body having a plurality of side walls, wherein the spring part is formed on each of the plurality of side walls and the spring part abuts against the shaft at each of a plurality of positions, and wherein the edge part is provided at each of positions corresponding to each of vertices of the cylindrical body.

5. A control valve according to claim 1, wherein the control valve functions as an expansion valve, in the refrigerant cycle, which throttles and expands the refrigerant, which has flowed in via an external heat exchanger, by allowing the refrigerant to pass through the valve section in the body so as to supply the refrigerant to an evaporator, controls a valve opening degree of the valve section by sensing a pressure and a temperature of the refrigerant returned from the evaporator, and delivers the refrigerant to a compressor, wherein the body has a first lead-in port, functioning as the lead-in port, through which the refrigerant is led in from the external heat exchanger, a first lead-out port, functioning as the lead-out port, through which the refrigerant is led out to the evaporator, a first passage, functioning as the refrigerant passage, which joins the first lead-in port to the first lead-out port, the valve hole provided midway along the first refrigerant passage, a second lead-in port through which the refrigerant returned from the evaporator is led in, a second lead-out port through which the refrigerant is led out to the compressor, and a second passage joining the second lead-in port to the second lead-out port, wherein a power element, which is activated by sensing temperature and pressure of the refrigerant flowing through the second passage, is provided, as the drive section, on an opposite side of the first passage relative to the second passage of the body, wherein the shaft is so provided as to run through the insertion hole, which is formed in a partition wall between the first passage and the second passage, one end side of the shaft is connected to the power element across the second passage, and an other end thereof is connected to the valve element, and the shaft transits the drive force of the power element to the valve element, and wherein the vibration-proof spring is contained in the mounting hole, which is formed, coaxially with the insertion hole, in the partition wall.

6. A control valve according to claim 2, wherein the control valve functions as an expansion valve, in the refrigerant cycle, which throttles and expands the refrigerant, which has flowed in via an external heat exchanger, by allowing the refrigerant to pass through the valve section in the body so as to supply the refrigerant to an evaporator, controls a valve opening degree of the valve section by sensing a pressure and a temperature of the refrigerant returned from the evaporator, and delivers the refrigerant to a compressor, wherein the body has a first lead-in port, functioning as the lead-in port, through which the refrigerant is led in from the external heat exchanger, a first lead-out port, functioning as the lead-out port, through which the refrigerant is led out to the evaporator, a first passage, functioning as the refrigerant passage, which joins the first lead-in port to the first lead-out port, the valve hole provided midway along the first refrigerant passage, a second lead-in port through which the refrigerant returned from the evaporator is led in, a second lead-out port through which the refrigerant is led out to the compressor, and a second passage joining the second lead-in port to the second lead-out port, wherein a power element, which is activated by sensing temperature and pressure of the refrigerant flowing through the second passage, is provided, as the drive section, on an opposite side of the first passage relative to the second passage of the body, wherein the shaft is so provided as to run through the insertion hole, which is formed in a partition wall between the first passage and the second passage, one end side of the shaft is connected to the power element across the second passage, and an other end thereof is connected to the valve element, and the shaft transits the drive force of the power element to the valve element, and wherein the vibration-proof spring is contained in the mounting hole, which is formed, coaxially with the insertion hole, in the partition wall.

7. A control valve according to claim 3, wherein the control valve functions as an expansion valve, in the refrigerant cycle, which throttles and expands the refrigerant, which has flowed in via an external heat exchanger, by allowing the refrigerant to pass through the valve section in the body so as to supply the refrigerant to an evaporator, controls a valve opening degree of the valve section by sensing a pressure and a temperature of the refrigerant returned from the evaporator, and delivers the refrigerant to a compressor, wherein the body has a first lead-in port, functioning as the lead-in port, through which the refrigerant is led in from the external heat exchanger, a first lead-out port, functioning as the lead-out port, through which the refrigerant is led out to the evaporator, a first passage, functioning as the refrigerant passage, which joins the first lead-in port to the first lead-out port, the valve hole provided midway along the first refrigerant passage, a second lead-in port through which the refrigerant returned from the evaporator is led in, a second lead-out port through which the refrigerant is led out to the compressor, and a second passage joining the second lead-in port to the second lead-out port, wherein a power element, which is activated by sensing temperature and pressure of the refrigerant flowing through the second passage, is provided, as the drive section, on an opposite side of the first passage relative to the second passage of the body, wherein the shaft is so provided as to run through the insertion hole, which is formed in a partition wall between the first passage and the second passage, one end side of the shaft is connected to the power element across the second passage, and an other end thereof is connected to the valve element, and the shaft transits the drive force of the power element to the valve element, and wherein the vibration-proof spring is contained in the mounting hole, which is formed, coaxially with the insertion hole, in the partition wall.

8. A control valve according to claim 4, wherein the control valve functions as an expansion valve, in the refrigerant cycle, which throttles and expands the refrigerant, which has flowed in via an external heat exchanger, by allowing the refrigerant to pass through the valve section in the body so as to supply the refrigerant to an evaporator, controls a valve opening degree of the valve section by sensing a pressure and a temperature of the refrigerant returned from the evaporator, and delivers the refrigerant to a compressor, wherein the body has a first lead-in port, functioning as the lead-in port, through which the refrigerant is led in from the external heat exchanger, a first lead-out port, functioning as the lead-out port, through which the refrigerant is led out to the evaporator, a first passage, functioning as the refrigerant passage, which joins the first lead-in port to the first lead-out port, the valve hole provided midway along the first refrigerant passage, a second lead-in port through which the refrigerant returned from the evaporator is led in, a second lead-out port through which the refrigerant is led out to the compressor, and a second passage joining the second lead-in port to the second lead-out port, wherein a power element, which is activated by sensing temperature and pressure of the refrigerant flowing through the second passage, is provided, as the drive section, on an opposite side of the first passage relative to the second passage of the body, wherein the shaft is so provided as to run through the insertion hole, which is formed in a partition wall between the first passage and the second passage, one end side of the shaft is connected to the power element across the second passage, and an other end thereof is connected to the valve element, and the shaft transits the drive force of the power element to the valve element, and wherein the vibration-proof spring is contained in the mounting hole, which is formed, coaxially with the insertion hole, in the partition wall.

\* \* \* \* \*